Nov. 29, 1938.  C. C. MORLEY  2,138,188

FLOWERPOT

Filed July 31, 1937

INVENTOR
Cornelius Cecil Morley.
By Arthur J. Stephens
Attorney.

Patented Nov. 29, 1938

2,138,188

UNITED STATES PATENT OFFICE 2,138,188

FLOWERPOT

Cornelius Cecil Morley, Trelawne, Looe, Cornwall, England

Application July 31, 1937, Serial No. 156,646
In Great Britain August 10, 1936

1 Claim. (Cl. 47—34)

The present invention relates to improvements in flower pots.

In order to cultivate seedlings in flower pots it is a normal practice to place a pane of glass over each pot to keep the atmosphere within humid. This practice however has the disadvantage that the underside of the pane has to be wiped periodically or otherwise the drops of moisture which accumulate there will drop onto the seedlings growing in the pot and cause what is known as "damping off".

This invention is designed to provide a flower pot wherein seedlings may be covered by a domed glass cover for long periods without danger of "damping off".

Briefly stated the invention comprises a flower pot provided with a flange projecting outwardly from its rim adapted to form a rest for the edge of a glass cover and so shaped as to drain away from the interior of the pot any moisture which has formed on the inner surface of the glass cover.

My invention is shown by way of example in the accompanying drawing in which:—

Figure 1:
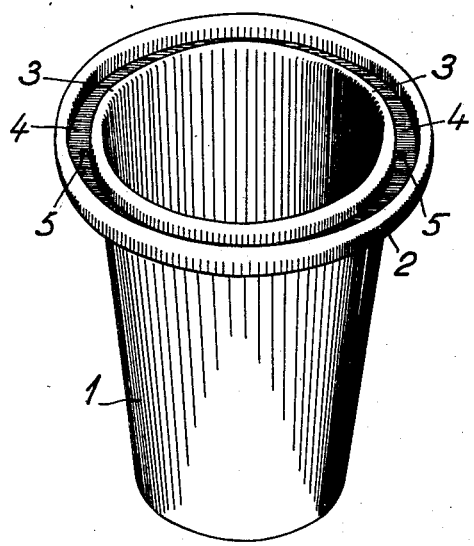
Figure 1 shows a perspective view of a flower pot provided with a channelled flange projecting outwardly from its rim.
Figure 2:
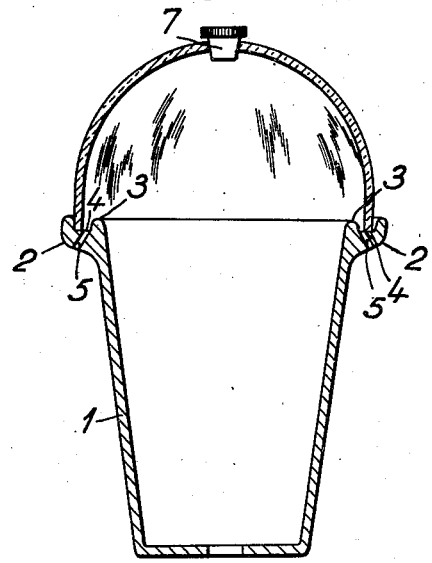
Figure 2 shows a section through the flower pot shown in Figure 1 with the glass cover in position on the flange.

In the construction shown in Figures 1 and 2 of the drawing the flower pot I has a flange 2 projecting outwardly from its rim 3. An annular channel 4 is provided in the flange 2. As shown in Figure 2 the pot I is used in conjunction with a domed glass cover of such a size that its rim fits into the said channel 4 in the flange. When moisture condenses on the underside of the glass cover it will run down into the channel and does not drip on to the seedlings growing in the pot. In the form shown draining holes 5 are provided at intervals in the flange extending through it from the channel 4 to the outside of the pot through which the moisture which passes into the channel from the inner surface of the glass cover passes along outside the pot, but the moisture which forms on the inner surface of the glass cover may not be sufficient to render these draining holes necessary.

Preferably a stopper 7 is provided in the top of the glass cover so as to allow air to enter within without the necessity of removing the glass cover from the flower pot should this be desired.

Figure 3:
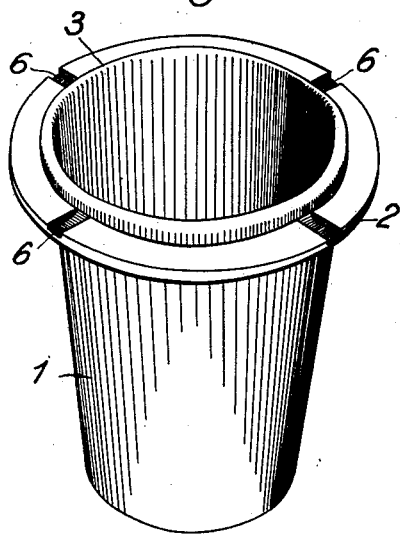
Figure 3 shows a perspective view of an alternative form of flower pot.
Figure 4:
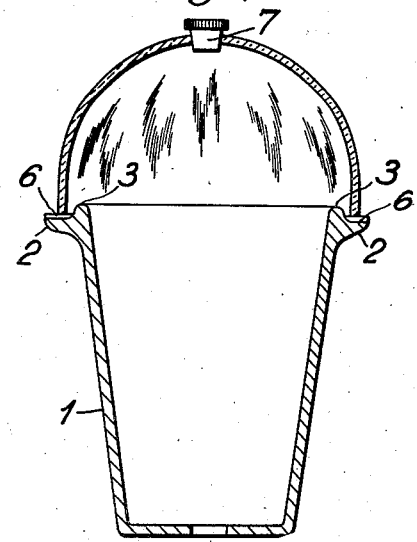
Figure 4 shows a section through the flower pot shown in Figure 3 with the glass cover in position on the flange.

In the construction shown in Figure 3 or 4 the flower pot is shown with the flange 2 which forms the support for the rim of the glass cover as an external shoulder without the channel 4 shown in Figures 1 and 2. This projecting flange 2 is so shaped that the moisture runs off its surface and it may be provided with shallow grooves 6 at intervals apart for this purpose.

What I claim is:—

A flower pot combined with a glass cover comprising a cover of a greater diameter than the flower pot, a flange projecting outwardly from the rim of the pot a short distance below its top edge provided with spaced apart drainage openings and adapted to form a rest for the edge of the glass cover in a position on the flange leaving sufficient space between the rim of the pot and the rim of the cover to open said spaced apart openings which are adapted to convey away from the interior of the pot any moisture which has formed on the inner surface of said glass cover.

CORNELIUS CECIL MORLEY.